United States Patent [19]
Chibata et al.

[11] 3,850,753
[45] Nov. 26, 1974

[54] CULTIVATION OF AEROBIC MICROORGANISMS

[75] Inventors: Ichiro Chibata, Suita; Shigeki Yamada, Toyonaka; Mitsuru Wada, Nara; Nobuhiko Izuo, Yamatotakada; Totaro Yamaguchi, Yono, all of Japan

[73] Assignee: Tanabe Seiyaku Co., Ltd., Osaka, Japan

[22] Filed: Mar. 13, 1973

[21] Appl. No.: 340,879

[30] Foreign Application Priority Data
Mar. 23, 1972    Japan.............................. 47-29302

[52] U.S. Cl................. 195/109, 195/49, 195/80 R
[51] Int. Cl............................................ C12b 1/20
[58] Field of Search............................ 195/109, 107

[56] References Cited
UNITED STATES PATENTS

| | | | |
|---|---|---|---|
| 2,523,245 | 9/1950 | Coppock | 195/107 |
| 3,164,533 | 1/1965 | Kronish et al. | 195/107 |
| 3,414,479 | 12/1968 | Wynes et al. | 195/107 |
| 3,723,255 | 3/1973 | Walden et al. | 195/109 |

*Primary Examiner*—Alvin E. Tanenholtz
*Attorney, Agent, or Firm*—Bierman & Bierman

[57] ABSTRACT

An aerobic microorganism is cultivated in the presence of a water-immiscible inert organic liquid in which oxygen has high solubility. Examples of the water-immiscible inert organic liquid include a liquid fluorocarbon and a silicone oil of low viscosity. Preferably the inert organic liquid is added to a fermentation medium in an amount of 5 to 80 v/v %, especially 8 to 40 v/v %. Growth, propogation and productivity of fermentation products of the aerobic microorganism are increased.

5 Claims, No Drawings

CULTIVATION OF AEROBIC MICROORGANISMS

This invention relates to an improved method of cultivating an aerobic microorganism.

It is known in the art that, in carrying out the cultivation of an aerobic microorganism in a liquid medium, the growth of the aerobic microorganism or the accumulation of fermentation products of the microorganism is influenced by the rate of oxygen transfer into the medium. Oxygen is hardly soluble in water. The presence of insufficient oxygen dissolved in the medium often results in poor growth of an aerobic microorganism or poor yield of a fermentation product. Various methods or techniques are known to increase the rate of oxygen transfer from the gas phase into the liquid medium. For example, the rate at which oxygen goes into the solution may be increased by improving the shape of the fermentation vessel (e.g., indenting the sides of a flask), the agitation speed or the amount of aeration, or raising the partial pressure of oxygen in the gas phase. Known methods will not maintain a high concentration of dissolved oxygen in the liquid medium. Microorgan microorganisms which can grow in a medium containing hydrocarbon compounds as the only source of carbon have been employed for the fermentative production of amino acids, enzymes, coenzymes and the like. These microorganisms demand a large amount of dissolved oxygen for their growth, and conventional aeration-agitation processes will not satisfy their oxygen demand.

One object of the present invention is to provide an improved fermentation method which is useful to increase the rate of oxygen transfer from the gas phase into the liquid phase. Another object of the invention is to provide a method which may be used to promote the growth or propagation of an aerobic microorganism or the accumulation of a fermentation product in a medium, or increase the yield of microbial cells of fermentation product. Still another object of the invention is to provide a fermentation method which maintains a high concentration of dissolved oxygen in an aqueous medium. A further object of the invention is to provide a method which enables one to curtail the operation time required for the cultivation of an aerobic microorganism. Still further objects of the present invention will be apparent from the disclosure which follows.

The method of the present invention comprises cultivating an aerobic microorganism in an aqueous nutrient medium in the presence of a water-immiscible inert organic liquid in which oxygen is highly soluble.

The water-immiscible inert organic liquid having a high oxygen solubility (hereinafter referred to simply as "the inert organic liquid") includes within its scope a liquid fluorocarbon and a low viscosity silicone oil. Liquid fluorocarbons employed in the present invention includes those having one to 20 carbon atoms. Preferred examples of said fluorocarbons are perfluorotributylamine [Chemical formula $C_{12}F_{27}N$; M.p. 174°C; Specific gravity 1.87; Oxygen solubility 39 ml/100 ml liq. (25°C); Manufactured by Minnesota Mining and Manufacturing Company under the trade name "Inert Liquid FC-43"], perfluoro-2-butylfuran [Chemical formula $C_8F_{16}O$; B.p. 102°C; Specific gravity 1.77; Oxygen solubility 49 ml/100 ml liq. (25°C); Manufactured by the 3M Company under the trade name "Inert Liquid FC—75" or "Inert Liquid FC-80"], perfluoro-n-heptane [Chemical formula $C_7F_{16}$; B.p. 115°C; Specific gravity 1.73; Oxygen solubility 42 ml/100 ml liq. (25°C); Manufactured by the 3M Company under the trade name "L-1822"], perfluronaphthalene [Chemical formula $C_{10}F_3$; B.p. 142°C; Specific gravity 1.95; Oxygen solubility 45 ml/100 ml liq. (25°); Manufactured by Allied Chemical Corporation under the trade neme "PP 5"], perfluoro-1-methyl-naphthalene [Chemical formula $C_{11}F_{10}$; B.p. 160°C; Specific gravity 1.97; Oxygen solubility 42 ml/100 liq. (25°C); Manufactured by Allied Chemical Corporation under the trade name "PP 9"], perfluoro-N-methyl-morpholine [Chemical formula $C_5F_{11}NO$; B.p. 50°C; Specific gravity 1.70; Oxygen solubility 42 ml/100 ml liq. (20°C); Manufactured by the 3M Company under the trade name "Inert Liquid FC—78"], 1,2,2,2-tetrafluoroethyl ether of perfluoro(2,5,8-trimethyl-3,6,9-trioxa-1-dodecanol [Chemical formula $C_{14}F_{29}O_4H$; B.p. 193°C; Specific gravity 1.763; Manufactured by E. I. Dupont under the trade name "Freon $E_4$"], perfluoro-1-methyldecaline [Chemical formula $C_{11}F_{20}$; B.p. 160°C; Specific gravity 1.972; Oxygen solubility 43 ml/100 ml liq. (37°C)]. The low viscosity silicone oil employed in the present invention includes those of having a viscosity of from 0.65 to 15 centipoise. A silicone oil having a molecular weight of 316 [B.p. 146°C; Specific gravity 0.85; Oxygen solubility 100 ml/100 ml liq. (25°C); Manufactured by Dow Corning Corporation under the trade name "DC—200—1CD"] is suitable. Although silicone oils having viscosities of from 3,000 to 5,000 centipoise have heretofore been used as antifoams in the aerobic cultivation, these viscous oils can not be employed for the purpose of the present invention. The preferred amount of the inert organic liquid to be added to the aqueous nutrient medium is approximately 5 to 80 v/v %, especially 8 to 40 v/v %. Generally, the greater amount of the inert organic liquid employed, the better the oxygen transfer rate. However, it is unnecessary to supply an amount of oxygen in excess of the oxygen uptake of a microorganism. From a practical standpoint, the amount of the inert organic liquid to be added to the medium depends upon the oxygen uptake of the microorganism. The inert organic liquid may be added before and/or after sterilization of the medium. When the inert organic liquid is added after sterilization of the medium, the inert organic liquid must be sterilized prior to its addition.

In carrying out the cultivation of aerobic microorganisms in accordance with the present invention, any conventional nutrient sources can be employed. For example, nutrient sources of carbon such as monosaccharides (e.g., glucose, lactose, galactose, sucrose), polysaccharides (e.g., starch, dextrin), sugar alcohols (e.g., sorbitol, mannitol), polyalcohols (e.g., glycerol) and organic acids (e.g., acetic acid, fumaric acid, citric acid), appropriate sources of nitrogen (e.g., peptone, meat extract, yeast extract, corn steep liquor, cotton seed lees, soybean powder, peanut powder, protein hydrolysates, inorganic nitrates, organic or inorganic ammonium salts), and inorganic elements can be used. In some case, a precursor or other minor ingredient which is required in the fermentative production of an amino acid, nucleic acid or antibiotic may be added to the medium. If necessary, a surfactant may also be added thereto.

The inert organic liquid employed in the present invention serves to increase the oxygen transfer rate from the gas phase into the liquid phase. The inert organic liquid of the invention also serves to supply oxygen directly into the liquid phase because oxygen dissolved in the inert organic liquid is liberated into the medium during the cultivation. Therefore, it is preferred to carry out the present invention under aeration, agitation and/or shaking. In this connection, however, it should be noted that the method of the present invention can be performed without aeration, agitation and/or shaking. For example, a small amount of the inert organic liquid is withdrawn from the medium at an appropriate time in the cultivation. The inert organic liquid thus separated is contacted with fresh air or oxygen gas so as to increase the oxygen content thereof. The said inert organic liquid is then reintroduced into the fermentation medium. By repeating these procedures during the cultivation, the concentration of oxygen dissolved in the medium can be always maintained at such a high level that aerobic cultivation can be advantageously carried out.

When the cultivation of an aerobic microorganism is completed, the fluorocarbon or silicone oil can be readily recovered from the liquid medium by means of the difference in their respective gravities. The fluorocarbon or silicone oil thus recovered can be re-used in the present invention.

The above-mentioned method of the present invention has wide application to the fermentation or cultivation of aerobic microorganisms. The present invention remarkably enhances the growth or propagation of a strain of actinomycetes (e.g., Streptomyces, Micromonospora), yeasts (e.g., Saccharomyces), molds (e.g., Aspergillus) and bacteria (e.g., Proteus, Escherichia, Serratia, Pseudomonas, Acromobacter, Corynebacterium, Micrococcus, Blevibacterium, Acetobacter), and the production of useful fermentation products (e.g., amino acids, antibiotics, enzymes, coenzymes, vitamins). Further because of the remarkable increase in the growth rate of these microorganisms or the productivity of the fermentation products, the operation time required for the fermentation or cultivation of these microorganisms can be shortened.

Practical and presently-preferred embodiments of the present invention are shown in the following Examples.

Example 1

500 ml of an aqueous nutrient medium containing 20 w/v % of sorbitol, one w/v % of corn steep liquor and 0.3 w/v % of calcium carbonate are charged into a one liter fermenter. A certain amount of perfluorotributylamine (Trade name: Inert Liquid FC—43) is added to the medium. The medium is sterilized by autoclaving and then cooled to 30°C. Acetobacter suboxydans ATCC 621 is inoculated into the medium. Then, the medium is cultivated at 30°C under aeration (250 ml/min.) and agitation (500 rotations/min.) until the oxidation of sorbitol to sorbose is completed. The results of the cultivation are shown in Table 1.

Table 1

| Amount of perfluoro tributylamine added (v/v %) | (A) (mol sorbose/ ml. hr.) | (B) (hr.) | (C) (hr.) | (D) (%) |
| --- | --- | --- | --- | --- |
| 0 | $5.8 \times 10^{-5}$ | 8 – 24 | 27 | 96 |
| 10 | $7.2 \times 10^{-5}$ | 6 – 18 | 20 | 97 |
| 20 | $8.9 \times 10^{-5}$ | 5 – 14 | 15 | 95 |

Table 1-Continued

| Amount of perfluoro tributylamine added (v/v %) | (A) (mol sorbose/ ml. hr.) | (B) (hr.) | (C) (hr.) | (D) (%) |
| --- | --- | --- | --- | --- |
| 40 | $9.6 \times 10^{-5}$ | 5 – 12 | 12 | 96 |

Note:
(A) means the maximum fermentation speed (i.e., the maximum speed of oxidizing sorbitol sorbitor to sorbose).
(B) means the duration of the maximum fermentation speed (i.e., the period of time during which the maximum fermentation speed is observed).
(C) means the time required to complete the fermentation.
(D) means the yield of sorbose (i.e., the conversion rate of sorbitol to sorbose).

Example 2

100 ml of an aqueous nutrient medium having the same composition as described in Example 1 are charged a 500 ml shaking flask. 20 ml of perfluorotributylamine (Trade name: Inert Liquid FC—43) are added to the medium. The medium is sterilized by autoclaving and then cooled to 30°C. Acetobacter suboxydans ATCC 621 is inoculated into the medium. Then, the medium is cultivated at 30°C under shaking (140 cycles/min., Stroke frequency: 8.5 cm). The maximum fermentation speed ($5.21 \times 10^{-5}$ mol. sorbose/ml. hr.) is observed for period of 10 to 28 hours after the cultivation begins. The fermentation is completed in about 30 hours.

When the cultivation is carried out without the above mentioned perfluorotributylamine, the fermentation is completed in 40 hours, with the maximum fermentation speed of $3.8 \times 10^{-5}$ mol. sorbose/ml. hr.

Example 3

The cultivation of Acetobacter suboxydans ATCC 621 is carried out in the same manner as described in Example 2 except that 100 ml of silicone oil (Trade name: DC—200—1CS) are employed instead of perfluorotributylamine. In this case, the fermentation is completed in about 20 hours, with the maximum fermentation speed of $7.45 \times 10^{-5}$ mol. sorbose/ml. hr.

Example 4

20 g of glucose, 6 g of diammonium phosphate, 2.5 g of L-aspartic acid, 5 g of yeast extract, one g of trisodium citrate, 0.25 g of magnesium sulfate 7 hydrate, 2 mg of zinc sulfate 7 hydrate and one mg of ferrous sulfate are dissolved in one liter of water. 500 ml of the aqueous medium is adjusted to pH 5.0 and charged into a one liter fermenter. A certain amount of perfluorotributylamine (Trade name: Inert Liquid FC—43) is added to the medium. The medium is sterilized by autoclaving and then cooled to 30°C. Yeast (Saccharomyces cerevisiae) is inoculated into the medium. Then, the medium is cultivated at 30°C under aeration (250 ml/min.) and agitation (500 rotation/min.) until yeast growth is complete. The results of the cultivation are shown in Table 2.

Table 2

| Amount of perfluoro tributylamine added (v/v %) | (A) (hr.) | (B) (1/hr.) | (C) (hr.) |
| --- | --- | --- | --- |
| 0 | 10 – 30 | 0.14 | 48 |
| 25 | 10 – 17 | 0.19 | 40 |
| 50 | 10 – 20 | 0.22 | 30 |

Note:
(A) means the duration of the active phase of propagation.

Table 2-Continued

| Amount of perfluoro tributylamine added (v/v %) | (A) (hr.) | (B) (1/hr.) | (C) (hr.) |
| --- | --- | --- | --- |

(B) means the specific growth rate (i.e., the growth rate (g/ml. hr.) of yeast at the active phase of propagation/the concentratin (g/ml) of yeast cells in the medium).

(C) means the time required to complete the cultivation.

Example 5

500 ml of an aqueous nutrient medium containing 20 w/v % of glycerol, 1.5 w/v % of corn steep liquor, 0.5 w/v % of ammonium fumarate and one w/v % of calcium carbonate are charged into a one liter fermenter. A certain amount of perfluorotributylamine (Trade name: Inert Liquid FC—43) is added to the medium. The medium is sterilized by autoclaving and then cooled to 30°C. Acetobacter suboxydans ATCC 621 is inoculated into the medium. Then, the medium is cultivated at 30°C under aeration (250 ml/min.) and agitation (500 rotations/min.) until the conversion of glycerol to dihydroxyacetone is completed. The results of the cultivation are shown in Table 3.

Table 3

| Amount of perfluoro tributylamine added (v/v %) | (A) (mol. dihydroxy-acetone/ml. hr.) | (B) (hr.) | (C) (hr.) |
| --- | --- | --- | --- |
| 0 | $3.8 \times 10^{-5}$ | 16 – 65 | 72 |
| 20 | $5.2 \times 10^{-5}$ | 15 – 60 | 64 |
| 40 | $6.3 \times 10^{-5}$ | 12 – 50 | 56 |
| 60 | $7.2 \times 10^{-5}$ | 10 – 45 | 56 |

Note:
(A) means the maximum fermentation speed (i.e., the maximum speed of converting glycerol to dihydroxyacetone).
(B) means the duration of the maximum fermentation speed.
(C) means the time required to complete the fermentation.

Example 6

100 ml of an aqueous nutrient medium containing 3 w/v % of starch, 4 w/v % of cotton seed lees, 0.2 w/v % of yeast extract, 0.5 w/v % of sodium chloride, 0.3 w/v % of calcium carbonate and 0.002 w/v % of cupric sulfate 5 hydrate are sterilized at 121°C for 20 minutes by autoclaving. A loopful of Streptomyces humidas var. sp. MCRL 0387 (deposited with the Agricultural Research Service Culture Collection of the Unites States Department of Agriculture under the accession number NRRL 3885) is inoculated into the medium, and the medium is cultivated at 27°C for 72 hours under aeration and agitation. A seed culture is thereby obtained.

100 ml of an aqueous nutrient medium containing 20 w/v % of a maltose syrup (maltose content: 50 – 60 %; manufactured by Hayashibara Co., Ltd. under the trade name "Malt Rup"), 4 w/v % of cotton seed lees, one w/v % of sodium chloride, 0.6 w/v % of calcium carbonate and 0.004 w/v % of cupric sulfate 5 hydrate are charged into a 500 ml Erlenmeyer flask. A certain amount of perfluorotributylamine (Trade name: Inert Liquid FC—43) is added to the medium. The medium is sterilized at 121°C for 20 minutes by autoclaving and then cooled. 3.1 ml of the seed culture are added to the medium. Then, the medium is cultivated of 27°C under shaking (140 cycles/min.). The amount (units/ml) of the antibiotic YA—56 accumulated in the medium is shown in Table 4.

Table 4

| Amount of perfluoro tributylamine added (v/v %) | The period of time cultivated | | |
| --- | --- | --- | --- |
| | 14 days | 15 days | 18 days |
| 0 | 7.5(7.0) | 15.2(7.4) | 33.0(7.3) |
| 10 | 10.0(7.1) | 17.1(7.3) | 36.0(7.1) |
| 15 | 14.2(6.9) | 23.2(7.0) | 43.0(7.0) |
| 20 | 15.2(6.9) | 22.7(7.1) | 46.0(7.1) |

Note:
1. The amount of the antibiotic YA-56 accumulated in the medium is estimated by the cylinderplate method using Escherichia coli NIHJ as a sensitive microorganism.
2. The numerical values shown in parenthesis are pH-values of the medium.

Example 7

50 ml of an aqueous nutrient medium containing 2.0 w/v % of polypeptone, 0.5 w/v % of meat extract, one w/v % of glucose, one w/v % of calcium carbonate and 0.5 w/v % of sodium chloride are sterilized by autoclaving. A loopful of Streptomyces fradiae ISP-5063 is inoculated into the medium, and the medium is cultivated at 25°C for 48 hours under shaking. A seed culture is thereby obtained.

50 ml of an aqueous nutrient medium having the same composition as above are charged into a 250 ml Erlenmeyer flask. A certain amount of perfluorotributylamine (Trade name: Inert Liquid FC—43) is added to the medium. The medium is sterilized at 121°C for 20 minutes by autoclaving and then cooled. One ml of the seed culture is added to the medium. Then, the medium is cultivated at 25°C under shaking (150 cycles/min.). The amount (mcg/ml) of the antibiotic Neomycin accumulated in the medium is shown in Table 5.

Table 5

| Amount of perfluoro tributylamine added (v/v %) | The period of time cultivated | | |
| --- | --- | --- | --- |
| | 2 days | 3 days | 5 days |
| 0 | 0.852(8.2) | 1.150(8.7) | 1.142(9.0) |
| 20 | 1.413(8.6) | 1.650(8.8) | 1.510(9.1) |

Note:
1. The amount of the antibiotic Neomycin accumulated in the medium is estimated by the cylinder-plate method using Staphylococcus aureus Terashima as a sensitive microorganism.
2. The numerical values shown in parenthesis are pH-values of the medium.

What we claim is:

1. In a method of cultivating an aerobic microorganism in an aqueous nutrient medium under aeration, agitation and/or shaking, the improvement which comprises carrying out the cultivation in the presence of a water immiscible inert liquid fluorocarbon having one to 20 carbon atoms.

2. The method according to claim 1, wherein a fluorocarbon selected from the group consisting of perfluorotributylamine, perfluoro-2-butylfuran, perfluoro-n-heptane, perfluoro-naphthalene, perfluoro-1-methyl-naphthalene, perfluoro-N-methyl-morpholine, 1,2,2,2-tetrafluoroethyl ether of perfluoro (2,5,8-trimethyl-3,6,9-trioxa-dodecanol) and perfluoro-1-methyldecaline is added to the medium in an amount of from 5 to 90 v/v%.

3. The method according to claim 1, wherein said fluorocarbon is added to the medium in an amount of from 5 to 80 v/v %.

4. The method according to claim 1, wherein said fluorocarbon is added to the medium in an amount of from 8 to 40 v/v %.

5. The method according to claim 1, wherein said fluorocarbon is selected from the group consisting of perfluorotributylamine, perfluoro-2-butylfuran, perfluoro-n-heptane, perfluoro-naphthalene, perfluoro-1-methyl-naphthalene, perfluoro-N-methyl-morpholine, 1,2,2,2-tetrafluoroethyl ether of perfluoro (2,5,8-trimethyl-3,6,9-trioxa-dodecanol) and perfluoro-1-methyldecaline.

* * * * *